W. SIMONSSON.
WEIGHING SCALE.
APPLICATION FILED AUG. 5, 1909.
1,198,673.
Patented Sept. 19, 1916.
2 SHEETS—SHEET 1.
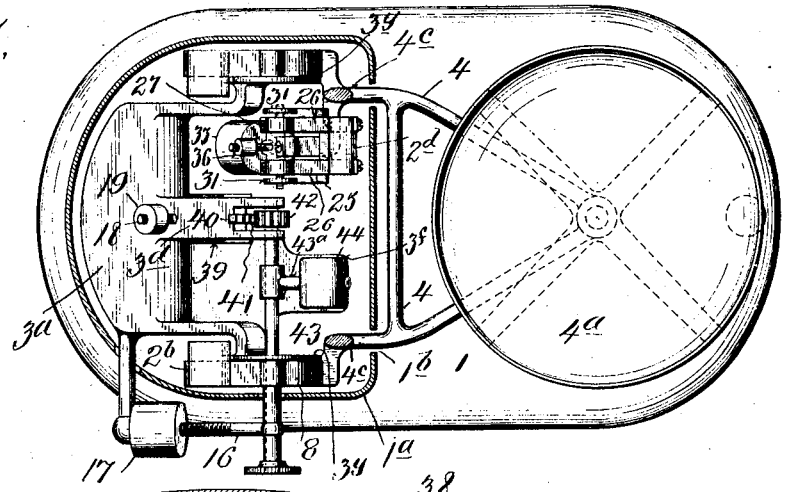
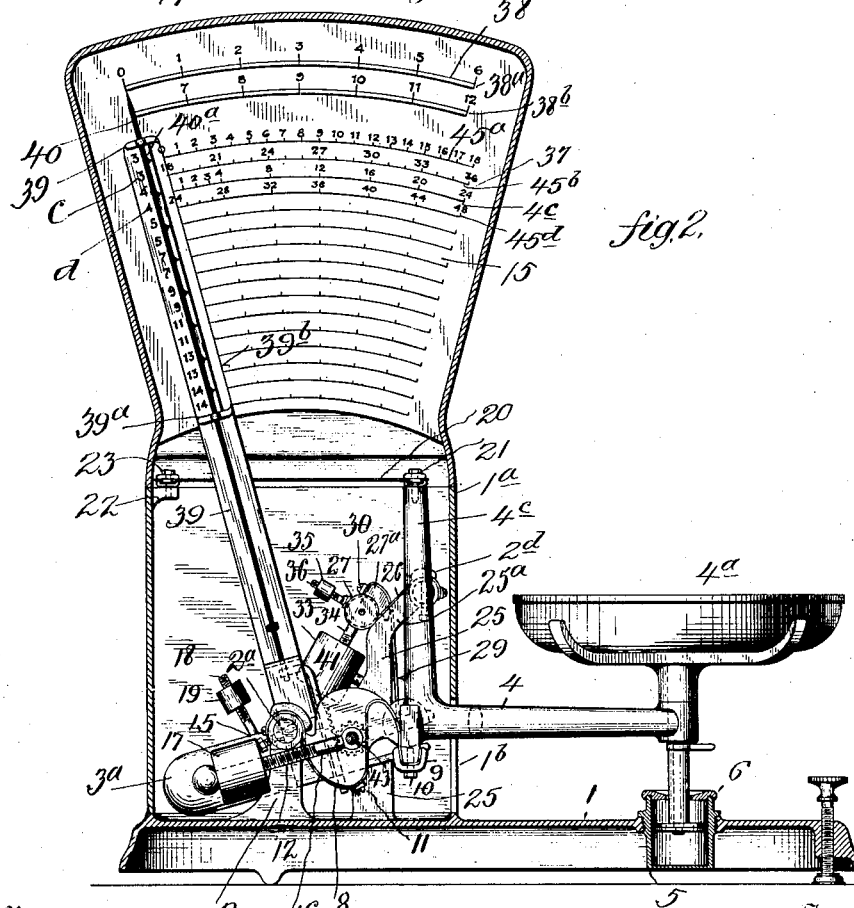

W. SIMONSSON.
WEIGHING SCALE.
APPLICATION FILED AUG. 5, 1909.
1,198,673.
Patented Sept. 19, 1916.
2 SHEETS—SHEET 2.
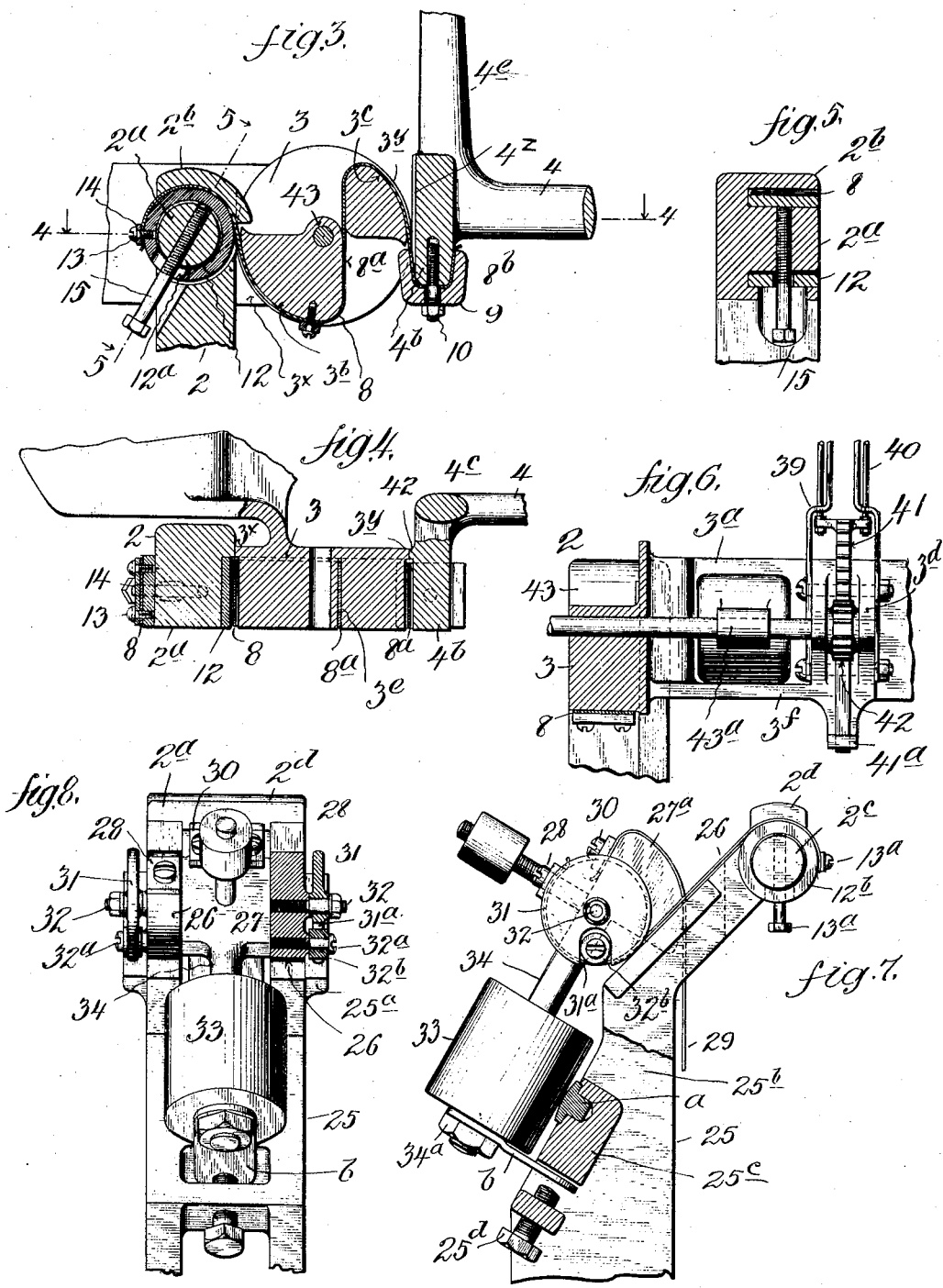

UNITED STATES PATENT OFFICE.

WILHELM SIMONSSON, OF NEW YORK, N. Y.

WEIGHING-SCALE.

1,198,673.

Specification of Letters Patent.  Patented Sept. 19, 1916.

Application filed August 5, 1909. Serial No. 511,360.

*To all whom it may concern:*

Be it known that I, WILHELM SIMONSSON, a subject of the King of Sweden, and resident of New York city, borough of Manhattan, in the county of New York and State of New York, have invented certain new and useful Improvements in Weighing-Scales, of which the following is a specification.

One of the objects of my invention is to provide improved means for movably supporting the scale beam and the pan or scoop support to afford accurate adjustment of the parts and weighing of the articles.

Another object is to provide improved means for mounting and actuating the scale beam counterpoise or controlling weight to render the same accurate in action and not liable to get out of order.

Another object of the invention is to provide improved means for increasing the range of the scale indicating devices while keeping the pointer within relatively small limits of movement, and whereby computations of sales price may be readily read, all by means of simple devices easily operated and not liable to get out of order.

My invention comprises novel details of improvement and arrangements of parts that will be more fully hereinafter set forth and then pointed out in the claims.

Reference is to be had to the accompanying drawings forming part hereof, wherein, Figure 1 is a partly sectional plan view of a weighing scale embodying my improvements; Fig. 2 is a vertical sectional view, partly in elevation; Fig. 3 is an enlarged detail side view of part of the scale beam and pan support, partly in section; Fig. 4 is a section substantially on the line 4, 4, in Fig. 3; Fig. 5 is a section substantially on the line 5, 5, in Fig. 3; Fig. 6 is an enlarged detail sectional view of part of the scale beam and pointer devices; Fig. 7 is a detail side view of the counterpoise devices, and Fig. 8 is an edge view of Fig. 7, partly in section.

Similar numerals of reference indicate corresponding parts in the several views.

The frame of the scale is shown provided with a suitable base 1 and an upwardly extending casing 1$^a$, which may be of any suitable construction, and said base is provided with standards or supports 2 at opposite sides from which the scale beam 3 is hung.

At 4 is a frame or arm supporting a suitable pan or receptacle 4$^a$ for articles to be weighed.

At 5 is a dash-pot shown carried by base 1, the plunger 6 of the dash pot extending from arm 4 below pan 4$^a$, whereby the shocks and vibration due to placing articles upon the pan 4$^a$ are resisted.

A suitable counterweight 3$^a$ is attached to or formed upon the central part of beam 3, the opposite sides of which are provided with spaced forwardly directed arms with rounded bearing members positioned in front of the standards or supports 2, 2. The arm 4 is shown forked at its rear part, its forks or bifurcations passing freely through slots 1$^b$ in casing 1 and being positioned in front of the rounded bearing members of beam 3. The scale beam 3 is hung upon flexible strips 8 that are secured at corresponding ends to supports 2 and attached to the scale beam in such manner that the latter may have free movement upon said strips so that its rounded bearing members afford rolling supports for the arm or frame 4 whereon the pan is carried. I do not claim broadly in this application a scale beam supported on flexible strips since the same is shown and claimed in my co-pending patent application, Serial No. 469,174. To efficiently support the scale beam upon said strips, permit ease of motion of the scale beam, and reduce friction, as well as to properly balance the parts and hold them in firm relation, I have shown the following arrangement:—The under surfaces 3$^b$ of the arms of the scale beam are suitably curved (see Figs. 2 and 3) and bear upon strips 8, and said strips are carried upwardly at 8$^a$ and over curved surfaces 3$^c$ of the scale beam, said strips being firmly attached at their ends 8$^b$ to the arm 4. I have shown clips 9 in socket form adapted to clamp the end portions 8$^b$ of strips 8 against the correspondingly shaped projecting portions 4$^b$ of arm 4, screws or the like 10 passing through clips 9 and into parts 4$^b$ serving to firmly hold end parts 8$^b$ of strips 8 between clips 9 and projections 4$^b$. I have shown the side walls of projections 4$^b$ in tapering form and the corresponding inner walls of the sockets of clips 9 in corresponding form, whereby the end parts 8$^b$ of strips 8 are securely gripped. The side walls of the arms of beam 3 are shown provided with upwardly disposed slits $3^e$ receiving the strips 8, whereby the latter are centered between the under curved surface $3^b$ and the upper curved surface $3^c$ of the respective scale beam arms. The strips 8 may be further secured by screws 11 passing through said strips and entering the corresponding part of the scale beam.

While strips 8 may be secured to supports 2 in any suitable manner, I have shown means for securely attaching said strips to said supports while at the same time providing for lengthwise adjustment of said strips, as follows: The supports 2 are provided with bosses or hubs $2^a$ at the sides alined with the overhanging or projecting ledges or walls $2^b$ that have an inner curvature substantially corresponding to the periphery of bosses $2^a$, and upon bosses $2^a$ are collars or sleeves 12 capable of movement on said bosses and between which collars or sleeves and ledges or walls $2^b$ the strips 8 are adapted to pass. Said strips are attached to the collars or sleeves 12 as by screws 13 shown holding clamp bars 14 against strips 8. At 15 is a screw meshing in threads in the corresponding hub or boss $2^a$ and adapted to bear against sleeve 12, whereby when strip 8 is between sleeve 12 and ledge $2^b$ and the screw 15 is forced against said sleeve the latter will press strip 8 against ledge $2^b$ to firmly clamp the strip in place, sleeve 12 moving on boss $2^a$ as required to effect such clamping of strip 8. Screw 15 passes through opening $12^a$ in sleeve 12. By having strip 8 secured to sleeve 12 the latter may be turned upon hub or boss $2^a$ to adjust strip 8 lengthwise for proper setting of the scale beam, whereupon sleeve 12 will be clamped in position.

The curved edges $3^x$ of scale beam 3 bear and ride against the sides of supports or posts 2, and said edges project slightly beyond strips 8, to prevent the faces $3^b$ from pressing said strips against said supports, the sleeves 12 also being sufficiently thin so that strips 8 will not be pressed against them by the scale beam, giving freedom of motion to the scale beam. The curved edges $3^y$ of the scale beam also bear against the faces $4^z$ of arm 4 to prevent pressure on strips 8 between the scale beam and frame 4 (see Fig. 4) to give freedom of motion between parts $3^c$ and $4^b$. In other words, spaces are formed between parts 2 and $3^b$ and between parts $3^c$ and $4^b$ for free play of strip 8 without creating friction, so that the scale beam is freely hung upon strips 8 from supports 2, and arm or frame 4 is freely hung from scale beam 3 by strips 8.

The scale beam 3 is shown provided with a threaded rod 16 carrying a weight 17 which may be adjusted along said rod to aid in balancing the scale beam, as to provide for tare in weighing. The balance weight $3^a$ or the scale beam 3 may also be provided with a threaded stem 18 having a weight 19 for adjustment in regulating the balance or position of the scale beam.

The arm 4 is shown provided with upwardly extending arms $4^c$ which are attached to casing $1^a$ by flexible strips 20, of sheet metal or the like, that are shown connected with the upper parts of arms $4^c$ by screws 21 and with brackets 22 on casing $1^a$ by screws 23, which strips 20 serve to aid in balancing arm 4 upon supporting strips 8 by preventing arm 4 from tilting forwardly, but the flexibility of strips 20 permit the arm 4 to descend as required.

The counterpoise arrangement I have shown is arranged as follows: At 25 is a standard extending upwardly from base 1 within casing $1^a$, the upper end of which standard has an offset or outwardly extending bearing portion $25^a$ to the upper end of which are attached flexible strips 26. Said bearing part $25^a$ is shown provided with an opening $25^b$ through which passes extension $27^a$, from a counterpoise 27. Strips 26 pass around the under curved surface of counterpoise 27 and are attached to the latter, as by screws 28. While the upper end of strips 26 may be attached to bearing portion $25^a$ of standard 26 in any suitable manner, I prefer to attach said strips thereto as shown in Fig. 7, (in the manner shown in Figs. 3, 4 and 5 respecting strip 8) wherein the sleeve $12^b$ surrounds boss or hub $2^c$ under the ledge $2^d$ on part $25^a$, a screw $15^a$ carried by boss $2^c$ serving to press sleeve $12^b$ against strip 26, said strips being secured to sleeve $12^b$ by screws $13^a$. From the extension $27^a$ of counterpoise 27 depends a flexible strip 29, the lower end of which is secured to arm 4 or an extension thereof or to scale beam 3 in any suitable manner, the upper end of strip 29 being attached to extension $27^a$ by one or more screws 30, the outer surface of extension $27^a$ being shown curved to receive strip 29. Counterpoise 27 is caused to roll along bearing $25^a$. The counterpoise is shown provided at opposite sides with rollers 31 journaled upon studs or the like 32 projecting from the counterpoise. Rollers 31 are of such diameter that when they rest upon bearing $25^a$ the counterpoise 27 will be raised so that it will not press strip or strips 26 upon bearing $25^a$, thus giving freedom for strip or strips 26 to wind upon and unwind from counterpoise 27.

To provide for accurate movement of the counterpoise and to compensate for wear and differences in diameter of counterpoise 27 and rollers 31 I provide a limited relative movement between counterpoise 27 and rollers 31, for which purpose each roller 31 is provided with an opening or recess $31^a$ through which passes a screw or stud $32^a$ secured in the counterpoise, which screws or studs are preferably provided with buffers 32ᵇ, of rubber or other suitable material, of diameter slightly less than the width of openings 31ᵃ within which said buffers are located, whereby when counterpoise 27 starts to rotate the rollers 31 will have slight independent rotation and be resiliently resisted by the buffers 32ᵇ. Said counterpoise is shown provided with a weight 33 carried by an arm 34 projecting from the counterpoise, which weight may be adjusted along arm 34 by meshing with threads upon the latter. Weight 33 may normally rest against standard 25. The counterpoise may also be provided with an adjusting weight 35 carried by threaded rod 36 extending from the counterpoise, whereby fine adjustment for balancing may be made. Weight 33 may bear upon a resilient buffer $a$, of rubber or the like, (Fig. 7). To hold the parts rigidly when the scale is to be moved about or transported I provide an extension $b$ shown secured to arm 34 by nut 34ᵃ and extending near cross bar 25ᶜ and adapted to be engaged by a screw 25ᵈ carried by upright 25, whereby said screw may lock projection $b$ against cross bar 25ᶜ, thus keeping the parts held firmly.

When articles to be weighed are placed in the pan or other support connected with the scale beam and the scale beam descends by reason of its flexible supports 8, the strip 29 will draw upon extension 27ᵃ, which is preferably provided with a curved surface engaging said strip, and thereby the counterpoise 27 and its weights will be rotated and the counterpoise will ride up along or with respect to bearing 25ᵃ during rotation to an amount commensurate with the weight in the scale pan until the scale beam properly balances. When the articles are removed from the pan the counterpoise will return to normal position drawing upon strip 29, the scale beam returning to normal position.

The means I have shown for causing indications of the weight of the articles being weighed are arranged as follows: At 37 is a suitable scale shown located in casing 1, and having graduations 38 to indicate the weight of the articles, such as pounds. I have shown two lines or series of graduations 38ᵃ, 38ᵇ, one above the other, such graduations in the illustration indicating pounds from zero to 6 on the graduation 38ᵃ and from 6 to 12 on the graduation 38ᵇ. At 39 is an index arm adapted to move relatively to the scale and provided with an index member or pointer 40, which is shown parallel with index arm 39 and adapted to slide relatively thereto. Index member or pointer 40 is adapted to point to the divisions or graduations of line 38ᵃ up to 6 pounds, and for weights from 6 pounds to 12 pounds the index member or pointer is adapted to be lowered to point along graduations 38ᵇ. For this purpose I have shown the following arrangement:—Index arm 39 is connected to a suitable projection 3ᵈ on counterweight 3ᵃ or the scale beam, so as to rock in accordance with the movement of the scale beam, said arm projecting upwardly so that pointer 40 will point to zero on the scale when the beam is balanced with no articles upon the pan. Pointer 40 is connected with a rack 41 guided in bearing 41ᵃ, which rack is in mesh with a pinion 42 on a shaft 43 that is journaled upon the scale beam, whereby when shaft 43 is rotated in one direction or the other the index member or pointer 40 will be raised or lowered. Shaft 43 is provided with a weight 44 shown connected with an arm 43ᵃ projecting from said shaft, which weight normally rests upon a supporting part 3ᶠ of the scale beam. The arrangement is such that when weight 44 is turned toward pan 4ᵃ the pinion and rack will cause pointer 40 to rise with respect to the upper scale line 38ᵃ and the weighing will proceed in accordance with the position of weight 44, say up to 6 pounds. If the weight is in excess of 6 pounds shaft 43 will be rocked to the left in Fig. 1 causing weight 44 to swing over to rest against support 3ᶠ on the left hand side of shaft 43, whereby index member or pointer 40 will be drawn downwardly by the pinion and rack to co-act with the lower scale line 38ᵇ, and the shifting of weight 44 will throw such weight farther from pan 4ᵃ toward the left to an amount equivalent to the extreme indications of scale line 38ᵃ (say 6 pounds), so that when the article is placed in pan 4ᵃ the pointer 40 will co-act with the lower scale line 38ᵇ, thereby indicating from such 6 pounds up to say 12 pounds. Of course, the extent and graduations of the scale lines 38ᵃ, 38ᵇ may be made according to the range desired of the scale and the weight 44 will be correspondingly arranged, either as to dimensions or distance from shaft 43, or both. The effect of such arrangement is that the indications or graduations of the scale may be relatively at considerable distances apart for ease in reading, and with such scale a comparatively large range of graduations may be provided in a minimum length of scale. In conjunction with such arrangement the scale may be provided with graduations or indications for computations of the price of an article. To this end I have shown a computing scale 45 arranged beneath the scale 38 for co-action with index arm 39 and index member or pointer 40. The scale or table 45 is shown arranged with two series of price graduations including plural lines of numbers 45ᵃ, 45ᵇ corresponding to one price per pound of articles, one being a reading continuation of the other, and corresponding lines of figures 45ᶜ, 45ᵈ, and continuations thereof, etc., to correspond with other prices per pound of articles, and so on. Upon arm 39 figures representing the price per pound are arranged in proper position with respect to the lines 45ª, 45ᵇ, and other figures representing a different price per pound are placed upon arm 39 in proper position with respect to the lines 45ᶜ, 45ᵈ, and so on for the scale according to conditions of prices.

In the illustrations the numerals 3 indicated at $c$ correspond to the lines 45ª, 45ᵇ, and the numerals 4 indicated at $d$ correspond to the lines 45ᶜ, 45ᵈ, and so on. The line 45ª has graduations numbered to accord with the multiple of 3 with the pound numbers of the scale line 38ª, as from zero to 6, and line 45ᵇ has numerals with the multiple of 3 with the numbers of the line 48ᵇ as from 6 to 12, the arrangement of the numbers of lines 45ª, 45ᵇ being such that when index member or pointer 40 points to a number of the scale 38ª or 38ᵇ a projection 40ª corresponding to the numerals $c$ will point to the numerals of the line 45ª or 45ᵇ; a corresponding projection of index member 40 is arranged for each of the duplicate lines 45ᶜ, 45ᵈ, etc. The position of such projections 40ª is such that when the pointer is raised to indicate at the top line 38ª of the scale 38 the corresponding projection 40ª will point to the corresponding top line of the computed numbers, and when the index member 40 is lowered to point to the indications of the line 38ᵇ then the projection 40ª of index member 40 will point to the computed numbers of the corresponding lower line 45ᵇ or 45ᵈ, etc., such computed numbering being seen through a slot in or indicated by a hairline 39ᵇ on arm 39. Thus, if the weight be two pounds and the price 3 cents per pound, then when index member 40 points to 2 on scale line 38ª the corresponding projection 40ª and hairline 39ᵇ will point to 6 on the price line 45ª, and if the weight of the article be 9 pounds and the price 3 cents per pound, then, after weight 44 has been turned to the left in Fig. 1 thereby drawing down index member 40, the latter will point to 9 on the lower index line 38ᵇ and the corresponding projection 40ª of the 3 cent price indication and hairline 39ᵇ will point at 27, on the line 45ᵇ. Similar representation of the sales price will be indicated on either of the computed price lines of scale 45, according to the price per pound and the weight of the articles. By this means the reading of the cost of an article according to its weight and price per unit of weight may be readily made. It will be understood that whatever the number of graduation lines of scale 38 there will be corresponding graduation lines of scale 45 bearing the proper computations according to and in proper correlation with the numbers indicating weight on scale 38 with respect to the numbers indicating price per unit of weight on arm 39.

Having now described my invention what I claim is:

1. A weighing scale comprising a scale beam, a flexible strip, a support for one end of said strip, the scale beam having a depressed curved surface opposed to said support and bearing against said strip and having a curved bearing surface at the side of said depressed surface, the support having a projecting part opposed to and bearing against said curved bearing surface of the scale beam providing a space receiving the strip that is wider than the thickness of the strip to prevent the beam from pressing the strip against the support, and means to maintain the scale beam in normal position.

2. A weighing scale comprising a scale beam provided with a curved surface extending downwardly, a flexible strip passing under said curved surface, said beam having an upwardly extending slot receiving said strip and also having an upwardly disposed curved surface over which the strip passes, an arm having a projection against which the end portion of said strip is laid, a clip secured to said projecting portion and bearing against said strip, means to support the opposite end of the strip, and means to maintain the beam in normal position.

3. A weighing scale comprising a scale beam, a flexible strip, an arm attached to the strip, means to support one end of said strip, the scale beam resting upon said strip between said arm and strip supporting means, said arm having a projection extending substantially in a direction across the plane of the beam, another strip connected to said projection, and means to hold said last named strip.

4. A weighing scale comprising a scale beam, a flexible strip, means to support one end of the strip, an arm, means to secure the strip at one part to the arm, said beam having a depressed curved surface bearing against the strip and providing a curved bearing surface at the side of the depressed surface, the arm having a projecting part bearing against said curved bearing surface providing a space receiving the strip to prevent the strip from bearing against the arm, and means to maintain the beam in normal position.

5. A weighing scale comprising a scale beam, a flexible strip, means to support articles connected to said strip, said beam resting upon said strip, a support having a boss, a sleeve on said boss attached to said strip, and means for securing said sleeve to said boss.

6. A weighing scale comprising a scale beam, a flexible strip, means to support articles connected to said strip, said beam resting upon said strip, a support having a boss, a sleeve on said boss attached to said strip, an abutment opposed to said strip and sleeve, and means for clamping said strip between said sleeve and abutment.

7. A weighing scale comprising a scale beam, a flexible strip, means to support articles connected to said strip, said beam resting upon said strip, a support having a boss, a sleeve on said boss attached to said strip, an abutment opposed to said sleeve, said strip lying between the sleeve and abutment, and a screw carried by said boss to force the sleeve toward the abutment to clamp the strip between the sleeve and abutment.

8. A weighing scale comprising a scale beam, a flexible strip, means to support articles connected to said strip, said beam resting upon said strip, a support having a boss, a sleeve having an opening at one side and mounted upon said boss, said strip being secured to said sleeve, an abutment opposed to the sleeve and strip, the strip passing between the sleeve and the abutment, and a screw carried by the boss to clamp the strip between the sleeve and the abutment.

9. A weighing scale comprising a scale beam, a flexible strip, means to support articles connected to said strip, said beam resting upon said strip, a support having a boss, a sleeve mounted upon the boss and secured to the strip, said sleeve having rotary adjustment upon the boss, and means to hold the sleeve in set position upon the boss.

10. A weighing scale comprising a beam, a flexible strip, an arm connected to said strip, said beam resting upon said strip, a support having a boss and an abutment opposed to the boss, a sleeve upon the boss, said strip passing between the sleeve and abutment, and means to secure the strip between the sleeve and the abutment.

11. The combination of a support having a boss, a sleeve movably supported upon the boss, an abutment opposed to the sleeve, and means coacting with the boss for forcing the sleeve and abutment relatively to each other to clamp a strip therebetween.

12. The combination of a support having a boss, an abutment adjacent the boss, a sleeve movably mounted upon the boss in line with the abutment, and a screw for forcing the sleeve and abutment together to clamp a strip therebetween.

13. The combination of a support having a boss, a sleeve movably supported upon the boss and provided with an opening, a screw passing through said opening and meshing with threads in the boss to bear on the opposite side of the sleeve, and an abutment opposed to the sleeve whereby a strip may be clamped between the sleeve and abutment.

14. A weighing scale comprising a bearing, a weighing member provided with disks loosely mounted thereon at its ends and supporting the member for rolling motion on the bearing, means to limit relative movement between said disks and said member, an arm projecting radially from the member, and a weight for said arm.

15. A weighing scale comprising a bearing, a counterpoise provided with rollers adapted to travel on said bearing, means enabling said rollers to have limited rotary motion with respect to the counterpoise, and means to movably support the counterpoise upon the bearing.

16. A weighing scale comprising a bearing, a counterpoise provided with rollers adapted to travel on said bearing, a pin and slot connection between the rollers and the counterpoise to provide limited relative movement between the rollers and the counterpoise, and means to movably support the counterpoise upon the bearing.

17. A weighing scale comprising a bearing, a counterpoise provided with rollers adapted to travel on said bearing, said rollers being provided with an opening, buffers carried by the counterpoise and received in said opening to permit limited relative movement between the rollers and the counterpoise, means to movably support the counterpoise upon the bearing, and scale mechanism connected with the counterpoise.

18. A weighing scale comprising a scale beam, flexible strips, means to support articles connected to the strips, supports for said strips, said beam resting upon said strips, an inclined bearing, a counterpoise adapted to roll with respect to the bearing, means to maintain the counterpoise upon the bearing, and means connecting the counterpoise with the scale beam.

19. A weighing scale comprising a scale beam, flexible strips, means to support articles connected to the strips, supports for said strips, said beam resting upon said strips, an inclined bearing, a counterpoise adapted to roll with respect to the bearing, means to maintain the counterpoise upon the bearing, and a flexible strip connecting the counterpoise with the scale beam.

20. A weighing scale comprising a scale beam, flexible strips, means to support articles connected to the beam, supports for said strips, said beam resting upon said strips, an inclined bearing, a counterpoise, a flexible strip connected with said bearing and the counterpoise to permit the latter to roll with respect to the bearing, and means connecting the counterpoise with the scale beam.

21. A weighing scale comprising a scale beam, an index arm secured to the beam to have movement therewith, a pointer slidable with respect to said arm, means to adjust said pointer in different positions with respect to said arm, a scale having a plurality of lines of graduations to co-act with said pointer, and means connected with said beam for adjusting said pointer with respect to said lines of the scale.

22. A weighing scale comprising scale mechanism, an adjustable pointer, means for operating the pointer by the scale mechanism, a scale having a plurality of lines of graduations, and counterbalancing devices connecting the scale beam with the pointer for setting the pointer at will and for retaining it in set position to co-act with either of said lines of graduations when so set.

23. A weighing scale comprising a scale beam, an arm secured thereto to be moved therewith, a pointer movably associated with said arm, a weight movably carried by the scale beam, and means connecting said weight with said pointer for moving the latter in accordance with the adjustment of the weight.

24. A weighing scale comprising scale mechanism, a pointer operated thereby, a scale having a plurality of lines of graduations, a weight carried by the scale beam, means for movably supporting said weight in different positions on the scale beam, and means connected with the scale beam and the pointer for setting the latter to accord with the position of the weight for co-action with one or the other of the lines of graduations of the scale.

25. A weighing scale comprising scale mechanism, a pointer operated thereby, a scale having a plurality of lines of graduations, a weight, a shaft connected with the weight and the scale mechanism to set the latter in different positions with respect to the scale beam, and devices connecting said shaft with the pointer for adjusting the latter with respect to the lines of graduations of the scale in accordance with the position of said weight.

26. A weighing scale comprising scale mechanism, a pointer operated thereby, a scale having a plurality of lines of graduations, a weight, a shaft connected with the weight and the scale mechanism, and gearing connecting the shaft with the pointer for adjusting the latter with respect to the lines of graduations of the scale in accordance with the position of said weight.

27. A weighing scale comprising scale mechanism, an arm connected with the beam of said mechanism, a pointer mounted to slide along said arm, a scale having a plurality of lines of graduations adjacent the pointer, an adjustable weight connected with the scale beam, and means connecting said weight with the pointer for adjusting the latter to accord with the position of said weight.

28. A weighing scale comprising scale mechanism including an arm having price numerals, a pointer actuated by the arm, means to adjust the pointer lengthwise at will along the arm, means to vary the counterbalancing effect when the pointer is in either position of adjustment, a scale having a plurality of lines of graduations, and a second scale having a plurality of lines of graduations bearing indications according to the computation of the price numerals and the numerals of the first named scale, the pointer having means to indicate such computations.

29. A weighing scale comprising scale mechanism, an arm connected therewith having price numerals, a pointer adapted to move with respect to said arm, a scale having a plurality of lines of graduations, means to adjust said pointer with respect to said lines of graduations, and a scale having a plurality of lines bearing indications according to computations of the price numerals and the numerals of the first named scale, the pointer having means to indicate such computations in its different positions of adjustment.

30. A weighing scale comprising scale mechanism, an arm connected with the beam of said mechanism and provided with price numerals, a pointer adapted to slide with respect to said arm, an adjustable weight connected with the scale beam, devices connecting said weight with said pointer for adjusting the latter according to adjustment of said weight, a scale having a plurality of lines of graduations, and a scale having a plurality of lines bearing indications according to computations of the price numerals and the numerals of the first named scale, the pointer having means to indicate such computations in its different positions of adjustment.

31. A weighing scale having scale mechanism, an arm connected with the beam of said mechanism and provided with price numerals, a pointer adapted to slide with respect to said arm, a shaft carried by the scale beam, a weight carried by the shaft, gearing connecting the shaft with the pointer, a scale having a plurality of lines of graduations, and a scale having a plurality of lines bearing indications according to computations of the price numerals and the numerals of the first named scale, the pointer having means to indicate such computations in its different positions of adjustment.

32. In a weighing scale the combination of a frame, scale mechanism provided with a counterpoise supported for rocking movement and having a projection, and a screw carried by the frame to hold said projection to keep the counterpoise from movement.

33. In a weighing scale the combination of a frame, a beam, a counterpoise supported for rocking movement, a bearing for the counterpoise, connections between the counterpoise and the beam, a projection extending from the counterpoise, and a screw carried by the frame to hold said projection to keep the counterpoise from movement on its bearing.

34. A weighing scale comprising balancing devices including a scale beam, weight indicating mechanism having a pointer and scale, an adjustable weight carried by the scale beam and arranged to vary the normal balance of said devices, and means connecting the pointer with the weight to adjust the pointer in accordance with the adjustment of said weight.

35. A weighing scale having index mechanism including two members, one of which is movable relatively to the other, one such member being provided with graduations in a plurality of series, one series affording in succession a continuation of the other, and the other member being a pointer adapted to traverse said graduations when one member is moved relatively to the other, and scale mechanism operatively connected with the movable index member and including a beam supported for rocking movement and an adjustable poise movably connected with the beam for adjustment on opposite sides of its axis and operable to vary the movement thereof to conform with the graduations in the respective series on the graduated index member.

36. A weighing scale having index mechanism including two members one of which is movable relatively to the other, one such member being provided with graduations in a plurality of series and the other member being a pointer adapted to traverse said graduations when one member is moved relatively to the other, and movable to register with the respective series of graduations of said graduated member, and scale mechanism operatively connected with the movable index member and including a beam supported for rocking movement, a poise connected with the beam and adjustable in different positions thereon to vary the movement thereof to conform with the graduations in the respective series, and means actuated from said adjustable poise for moving the pointer to register first with one series of graduations on the graduated index member and then with the other series of graduations on said graduated index member.

37. A weighing scale having index mechanism including two members, one of which is movable relatively to the other, one such member being provided with graduations in a plurality of series and the other member being a pointer adapted to traverse said graduations when one member is moved relatively to the other and movable to register with the respective series of graduations of the graduated member, and scale mechanism operatively connected with the movable index member and including a beam supported for rocking movement, a weighted pendulum controlling the movement of the beam, a poise adjustable in different positions upon the beam to vary the movement thereof to conform with the graduations in the respective series and means actuated from said adjustable poise for moving the pointer to register first with one series of graduations on the graduated index member and then with the other series of graduations on said graduated index.

38. A weighing scale having index mechanism including two members, one of which is movable relatively to the other, one such member being provided with graduations in a plurality of series, one series affording in succession a continuation of the other, and the other member being a pointer adapted to traverse said graduations when one member is moved relatively to the other, and scale mechanism operatively connected with the movable index member and including a beam supported for rocking movement, a weighted pendulum controlling the movement of the beam, and an adjustable poise connected with the beam and adjustable on opposite sides of its axis to vary the movement thereof to conform with the graduations in the respective series on the graduated index member.

Signed at New York city, in the county of New York, and State of New York, this 2nd day of August, A. D. 1909.

WILHELM SIMONSSON.

Witnesses:
RALPH H. RAPHAEL,
T. F. BOURNE.